US012091912B2

(12) United States Patent
Mesa et al.

(10) Patent No.: US 12,091,912 B2
(45) Date of Patent: Sep. 17, 2024

(54) GOALPOST MOUNTING ASSEMBLY

(71) Applicant: McCue Corporation, Danvers, MA (US)

(72) Inventors: Teodoro A. Mesa, Lynn, MA (US); Evan Oswald, Marblehead, MA (US); David DiAntonio, Andover, MA (US)

(73) Assignee: McCue Corporation, Danvers, MA (US)

( * ) Notice: Subject to any disclaimer, the term of this patent is extended or adjusted under 35 U.S.C. 154(b) by 356 days.

(21) Appl. No.: 17/528,525

(22) Filed: Nov. 17, 2021

(65) Prior Publication Data

US 2023/0151689 A1 May 18, 2023

(51) Int. Cl.
*E06B 9/58* (2006.01)
*E01F 15/14* (2006.01)

(52) U.S. Cl.
CPC ............ *E06B 9/581* (2013.01); *E01F 15/141* (2013.01)

(58) Field of Classification Search
CPC .... E06B 9/581; E01F 15/141; E04H 12/2292; E04H 17/20; F16B 7/00; F16B 7/0406; F16B 7/0413; F16B 7/042; Y10T 403/40; Y10T 403/405; Y10T 403/7047; Y10T 403/7061
USPC ............................................................ 52/211
See application file for complete search history.

(56) References Cited

U.S. PATENT DOCUMENTS 2,508,832 A * 5/1950 Mcaninch ................. F16D 1/04 403/359.6
3,898,012 A * 8/1975 Gillin ...................... F16B 12/24 403/287
3,932,048 A * 1/1976 DuPont ................... F16B 12/40 403/295
4,183,505 A * 1/1980 Maestri ................... E01F 15/06 114/220
4,636,106 A * 1/1987 Waisbrod ................ F16C 27/02 403/228
4,790,683 A * 12/1988 Cramer, Jr ............ F16D 1/0835 403/372
4,989,835 A * 2/1991 Hirsh ...................... B61L 29/04 49/34
5,630,302 A * 5/1997 Rosenband ........... E04H 1/1266 52/489.1
5,809,733 A * 9/1998 Venegas, Jr. .......... E01F 15/003 52/301
6,279,276 B1 * 8/2001 Knoll ................. B65G 69/2876 160/205
6,357,187 B1 * 3/2002 Haldeman ................. E06B 3/88 52/717.06
7,186,050 B2 * 3/2007 Dean ..................... F16B 7/0413 403/379.6
7,584,932 B2 * 9/2009 Shih ........................ E04G 17/14 248/688
8,066,247 B2 * 11/2011 Spera ...................... E04G 11/50 248/407

(Continued)

*Primary Examiner* — James M Ference
(74) *Attorney, Agent, or Firm* — Occhiuti & Rohlicek LLP

(57) ABSTRACT

A protective barrier and a door frame protection system include a bar having an upper section having an outer dimension; a lower section having an inner dimension greater than the outer dimension of the upper section, the lower section configured to receive the upper section; and a shock absorber configured to be positioned within the lower section and around the upper section, the shock absorber having an outer dimension less than the inner dimension of the lower section and an inner dimension greater than the outer dimension of the upper section.

11 Claims, 5 Drawing Sheets

FIG. 6A

(56) References Cited

U.S. PATENT DOCUMENTS

| | | | | |
|---|---|---|---|---|
| 8,267,262 | B2 * | 9/2012 | Thelwell | A47B 95/043 5/663 |
| 8,820,722 | B2 * | 9/2014 | Reinert, Sr. | E04H 17/17 256/65.14 |
| 9,103,163 | B2 * | 8/2015 | McCue | E01F 15/141 |
| 10,132,427 | B1 * | 11/2018 | Park | F16L 1/09 |
| 2002/0150710 | A1 * | 10/2002 | Russo | B32B 5/32 428/317.1 |
| 2004/0071496 | A1 * | 4/2004 | Chun Yueh | A63B 5/11 403/14 |
| 2008/0256881 | A1 * | 10/2008 | Lowry | E06B 3/88 52/211 |
| 2010/0212227 | A1 * | 8/2010 | Perkins | E01F 13/048 49/70 |
| 2012/0104320 | A1 * | 5/2012 | Postma | C09D 5/22 252/301.36 |
| 2014/0069046 | A1 * | 3/2014 | Cai | E04H 12/08 52/704 |
| 2014/0140764 | A1 * | 5/2014 | Stratford | E01F 9/629 404/6 |
| 2014/0154007 | A1 * | 6/2014 | Ustach | E01F 15/003 404/6 |
| 2014/0196997 | A1 * | 7/2014 | Michael | E01F 15/141 188/377 |
| 2014/0318052 | A1 * | 10/2014 | McCue | E06B 1/52 52/211 |
| 2018/0283040 | A1 * | 10/2018 | McCue | E04H 17/1465 |
| 2020/0115864 | A1 * | 4/2020 | Mesa | E01F 15/06 |
| 2021/0062573 | A1 * | 3/2021 | Mesa | E06B 9/00 |
| 2023/0151689 | A1 * | 5/2023 | Mesa | E01F 15/141 160/133 |

* cited by examiner

GOALPOST MOUNTING ASSEMBLY

BACKGROUND

This invention relates to an apparatus for protecting a door frame.

Warehouses, distributions centers, factories, and similar facilities often have large stock handling equipment such as fork trucks which frequently move stock into, out of, and around the facility. In some examples, a piece of large stock handling equipment (e.g., a fork truck) retrieves stock from one location in a facility (e.g. from a shelf), transports the stock through the facility to a destination location (e.g., a loading dock). As the fork truck transports the stock through the facility it may pass through a number of doorways in the facility.

The doorways in warehouses, distribution centers, factories, and similar facilities often include shutter-type overhead roll-up doors. These doors include a motorized rolling mechanism installed above the doorway which is used to lower the door into a closed position or to retract the door into an open position. In the open, retracted position, the door is rolled onto a cylinder. Shutter tracks, which guide the shutter-type door as it is lowered and retracted, are often installed on the sides of the doorways.

SUMMARY

It is often the case that warehouses, distribution centers, factories, and similar facilities have a high amount of stock handling equipment traffic. As operators navigate through the doorways in the facility, the stock-handling equipment (e.g., trucks) may occasionally make contact with the door frames of the doorways and certain components of the shutter-type overhead roll-up doors installed thereon. In one example, a fork truck may make contact with the side of the doorway, possibly contacting and damaging the door's shutter tracks. In another example, a fork truck may have its mast deployed to an extent that it makes contact with rolled door and/or the motorized rolling mechanism, possibly causing damage to the door and/or rolling mechanism. In another example, where no shutter-type roll-up door is installed on a doorway, a fork truck may make contact and damage the top or sides of the door frame.

In a general aspect, a protective barrier includes a bar including an upper section having an outer dimension; a lower section having an inner dimension greater than the outer dimension of the upper section, the lower section configured to receive the upper section; and a shock absorber configured to be positioned within the lower section and around the upper section, the shock absorber having an outer dimension less than the inner dimension of the lower section and an inner dimension greater than the outer dimension of the upper section.

In another aspect, in general, a door frame protection system includes a first upright bar including a first upper section having a first outer dimension and a first length; a first lower section configured to receive the first upper section wherein the inner dimension of the first lower section is greater than the first outer dimension of the first upper section; a first shock absorber configured to be positioned within the first lower section and around the first upper section, the first shock absorber having an outer dimension less than the inner dimension of the first lower section and an inner dimension greater than that of the outer dimension of the first upper section; a first mounting assembly configured to secure the first lower section to a ground portion; a second upright bar including a second upper section having a second outer dimension and a second length; a second lower section configured to receive the second upper section wherein the inner dimension of the second lower section is greater than the second outer dimension of the second upper section; a second shock absorber configured to be positioned within the second lower section and around the second upper section, the second shock absorber having an outer dimension less than the inner dimension of the second lower section and an inner dimension greater than that of the outer dimension of the second upper section; a second mounting assembly configured to secure the second lower section to a ground portion; a third bar having a third outer dimension and a third length; a first coupler having an inner dimension that is greater than the first outer dimension of the first upright bar and greater than the third outer dimension of the third bar; and a second coupler having an inner dimension that is greater than the second outer dimension of the second upright bar and greater than the third outer dimension of the third bar.

Among other advantages, the protective barrier and the door frame protection system use a shock absorbing dampener, which absorbs impact energy. The presence of the shock absorbing damper helps mitigate damage to a door frame protected by the protective barrier and door frame protection system in the event of a collision.

Embodiments of these aspects of the invention may include one or more of the following features.

The bar may be cylindrical such that the outer and inner dimensions of the upper and lower sections, respectively, are an outer and inner diameter.

In further embodiments, the shock absorber may include a protruded section and a non-protruded section wherein the protruded section characterizes a protruded inner diameter and a protruded outer diameter; the protruded section includes a first pair of arcuate protuberances and a second pair of arcuate protuberances wherein the arcuate protuberances in the first pair are diametrically opposed from each other; and the arcuate protuberances in the second pair are diametrically opposed from each other; the non-protruded section characterizes a non-protruded inner diameter and a non-protruded outer diameter wherein the non-protruded outer diameter is equal to the protruded inner diameter; the outer dimension of the shock absorber is characterized by the protruded outer diameter; and the inner dimension of the shock absorber is characterized by the non-protruded inner diameter.

In further embodiments, the upper section of the bar includes a first receiving hole; the shock absorber includes a second receiving hole; the lower section of the bar includes a third receiving hole; and the protective barrier further includes a pin configured to be inserted through the first receiving hole, the second receiving hole, and the third receiving hole when the first, second, and third receiving holes are substantially aligned.

In further embodiments, the protective barrier includes a mounting assembly configured to secure the lower section to a ground portion.

In further embodiments, the protective barrier includes a protective cap configured to be placed around at least the lower section. Advantages of this feature include the fact that protective cap hides the receiving hole in the lower section from view.

In further embodiments, the protective barrier may include a coupler having an inner diameter greater than the outer diameter of the upper section, configured to receive the upper section of the bar.

Embodiments of the door frame protection system may include one or more of the following features.

The door frame protection system may include a third bar having a third outer dimension and a third length. In further embodiments, this bar is cylindrical, and its third outer dimension is its outer diameter.

In further embodiments, the door frame protection system may include a first coupler which couples the first upright bar and the third bar, further utilizing a first pin to couple the first upright bar to the first coupler and a second pin to couple the third bar to the first coupler.

In further embodiments, the door frame protection system may include a second coupler which couples the second upright bar and the third bar, further utilizing a third pin to couple the second upright bar to the second coupler and a fourth pin to couple the third bar to the second coupler.

In further embodiments, the third bar is coupled between the first coupler and the second coupler.

Other features and advantages of the invention are apparent from the following description, and from the claims.

Figure 6A:
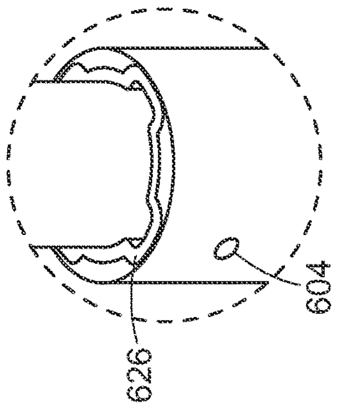
FIG. 6 is a perspective view of a door frame protection system that includes a shock absorption member in its anchoring system.
Figure 6:
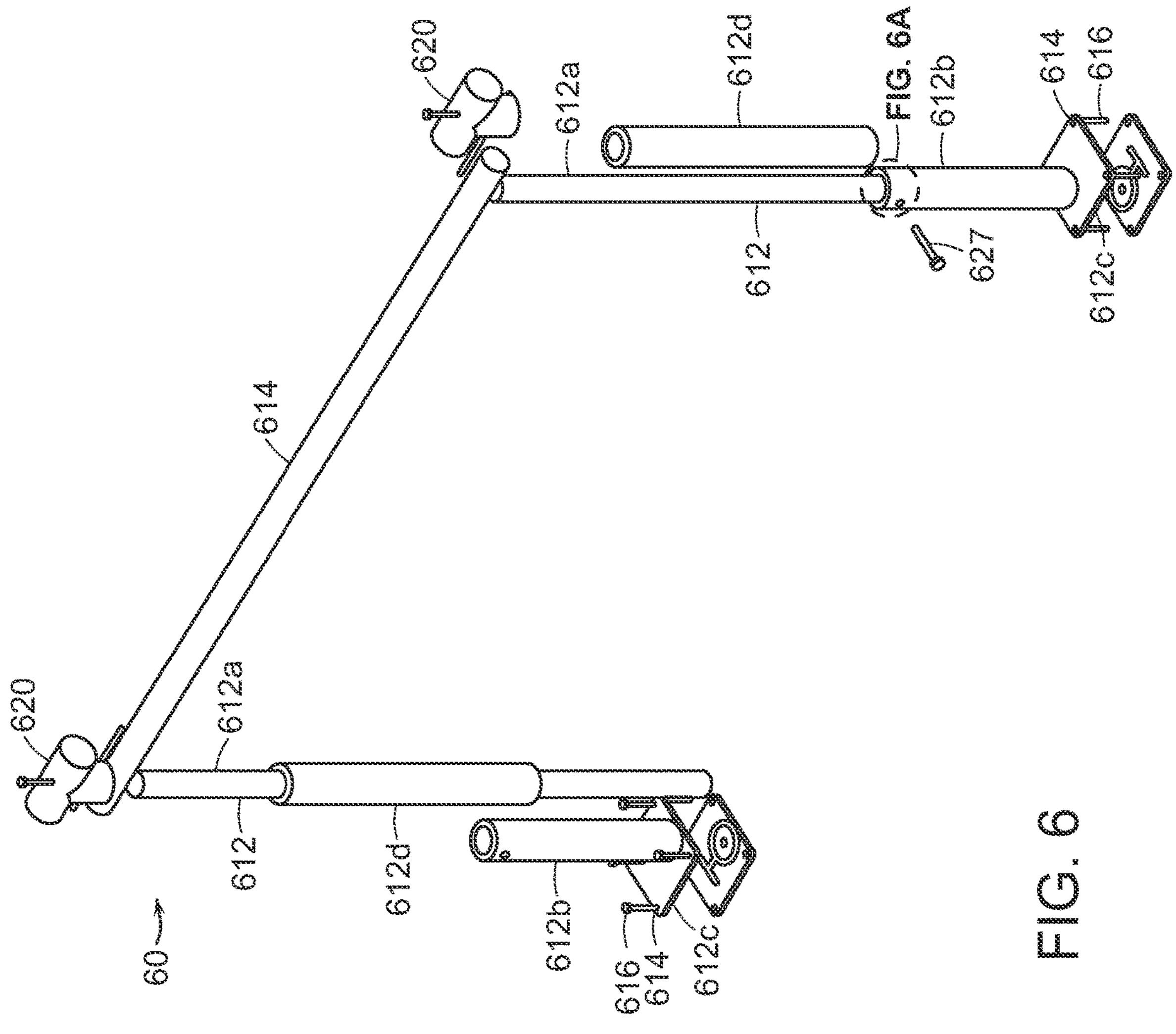

FIG. **6*a* shows the shock absorption member of the door frame protection system shown in FIG. 6**.

Figure 7:
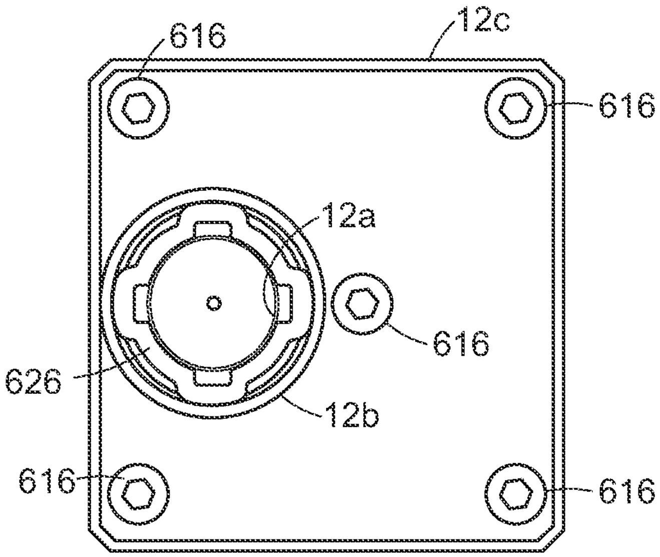

FIG. 7 is a top-down view of the anchoring system including the shock absorption member of FIG. 6.

DETAILED DESCRIPTION

Figure 1:
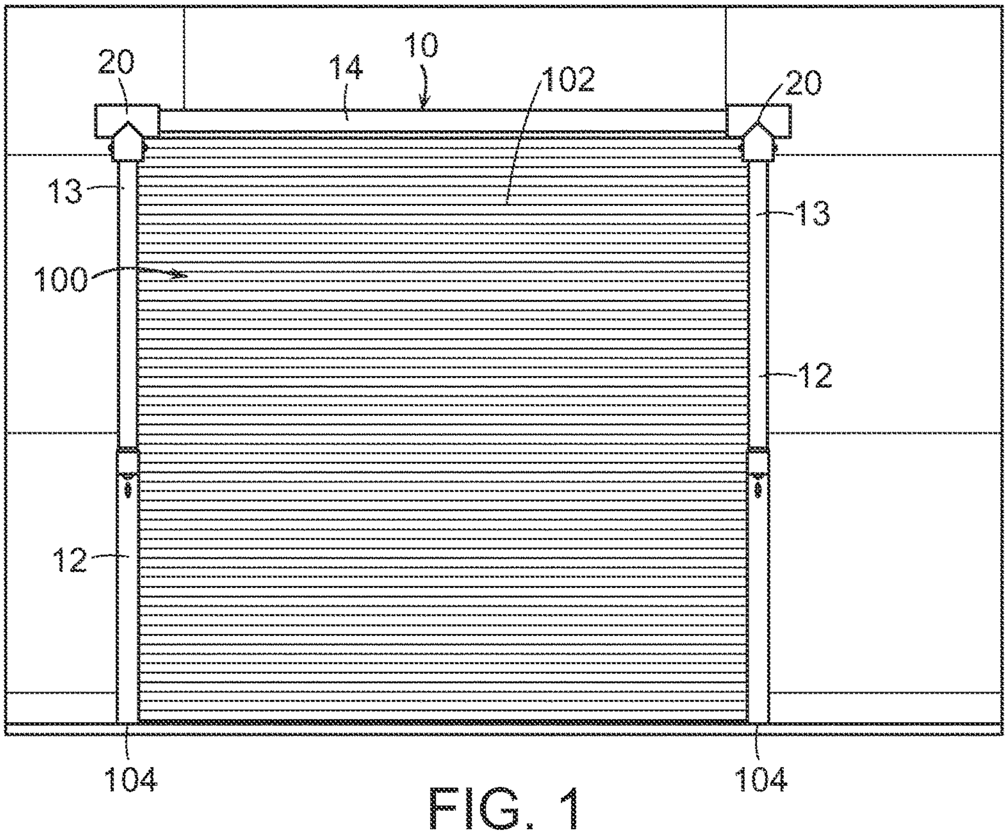
FIG. 1 illustrates a door frame protection system for use in warehouse setting.

Referring to FIG. 1, a door frame protection system 10 is positioned at the entrance of a warehouse opening 100, which may include a door 102 (e.g., a roll-up door). The warehouse opening 100 is generally located at an area of the warehouse where goods are loaded and unloaded. For example, the warehouse opening 100 allows for trucks to back up to the opening where a forklift or pallet truck (neither shown) is used to load or unload goods into and out of the truck through the warehouse opening 100.

Figure 2:
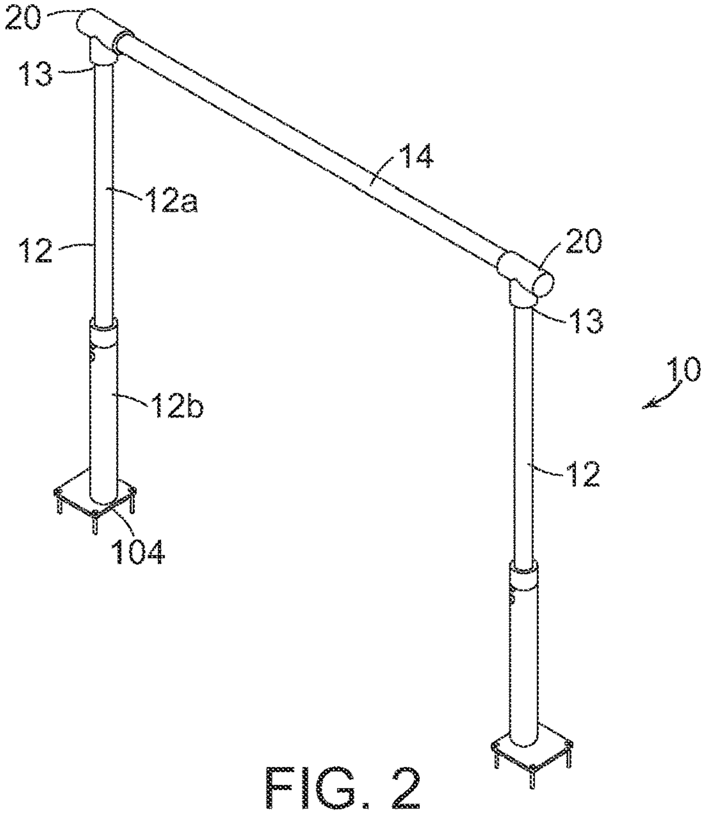
FIG. 2 is a perspective view of the door frame protection system of FIG. 1.

Referring to FIG. 2, the door frame protection system 10 includes two cylindrical upright bars 12, each of which is anchored into the ground at an anchor point 104. Details regarding the way in which cylindrical upright bars 12 may be anchored to the ground and floor can be found in U.S. Pat. No. 9,103,163, which is incorporated herein by reference. Top ends 13 of each of the upright bars 12 are connected by a cylindrical overhead crossbar 14 using couplers 20. Each of the cylindrical upright bars 12 includes an upper section **12*a* positioned within a lower section 12*b* in telescoping fashion to allow for the adjusting of the height of crossbar 14 relative to a mounting base 12*c***.

Figure 3:
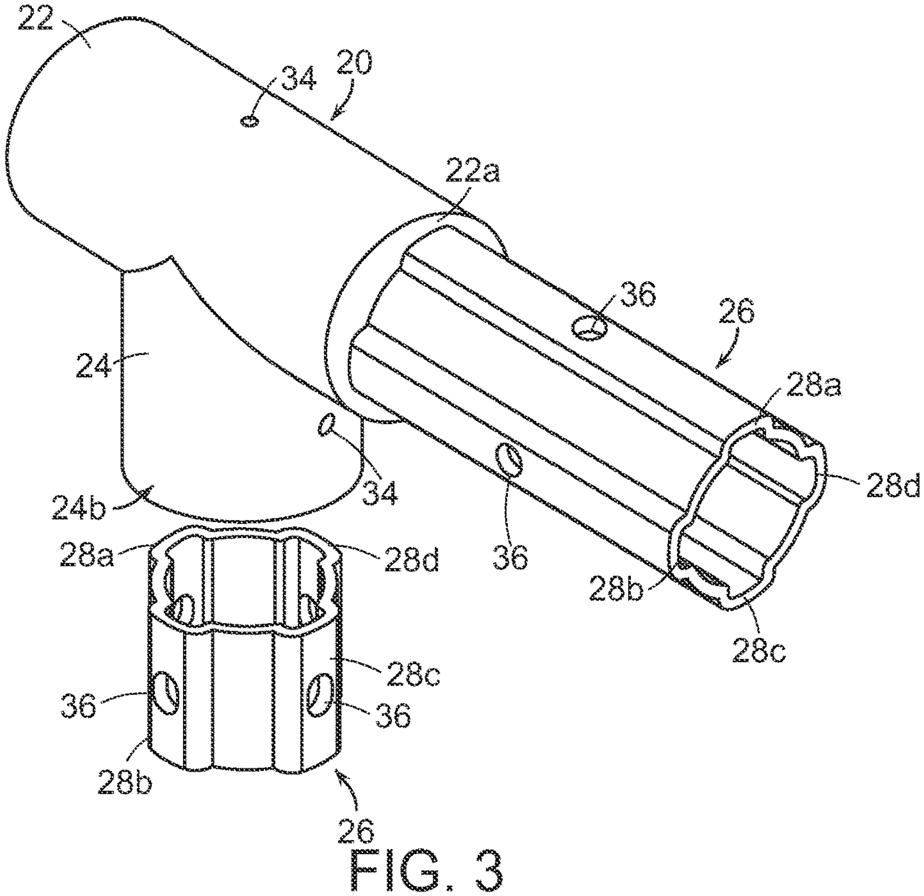
FIG. 3 is an exploded, isometric view of a coupler for use in the door frame protection system of FIG. 1.
Figure 4:
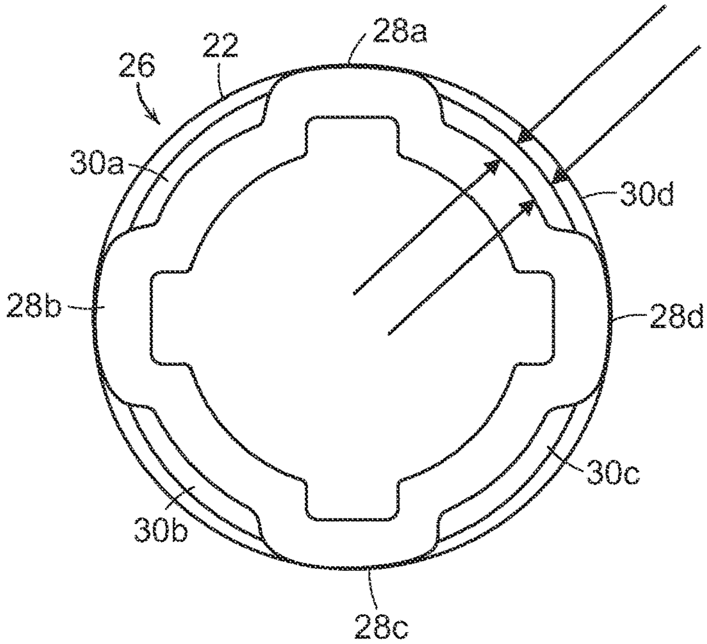
FIG. 4 is an end view of the coupler of FIG. 2.

Referring to FIGS. 3 and 4, coupler 20 is T-shaped in that a first cylindrical tube 22 is transverse to a second cylindrical tube 24. Each of first cylindrical tube 22 and second cylindrical tube 24 includes cylindrical inner passages, **22*a*, 24*a*, respectively for receiving shock absorbers 26. Inner passages 22*a*, 24*a* of first cylindrical tube 22 and second cylindrical tube 24 have inner diameters commensurate with outer diameters of the shock absorbers such that there is a relatively tight fit therebetween. Moreover, first cylindrical tube 22 and second cylindrical tube 24 have sufficient lengths for allowing upper sections 12*a* of upright bars 12 as well as end portions of overhead crossbar 14** to move therein. This allows for using upright bars and overhead crossbars with imprecise lengths.

In some examples, the cylindrical upright bars 12 and cylindrical overhead crossbar 14 are formed of steel, and coupler 20 is made of a high-density polyethylene (HDPE).

Referring to FIG. 4, in one embodiment, shock absorbers 26 include two pairs of arcuate protuberances **28*a*,28*b*, 28*c*, 28*d*. Arcuate protuberances 28*a* and 28*c* are diametrically opposed from each other. Arcuate protuberances 28*b*, 28*d* are also diametrically opposed from each other. The outer diameters of arcuate protuberances 28*a*,28*b*, 28*c*, 28*d* are slightly less than the inner diameters of first cylindrical tube 22 and second cylindrical tube 24 such that shock absorbers 26 can be positioned within first and second cylindrical tubes 22, 24 with a friction fit. Between each of arcuate protuberances 28*a*,28*b*, 28*c*, 28*d* are arcuate gaps 30*a*, 30*b*, 30*c*, 30*d*. Each of arcuate gaps have outer diameters which are less than the outer diameters of arcuate protuberances 28*a*, 28*b*, 28*c*, 28*d*. With this arrangement, shock absorbers 26 act as dampeners to absorb forces to the door frame protection system due to any impact to upright bars 12, overhead crossbar 14, or coupler 20 itself. For example, if a forklift were to strike one or more of the upright bars 12 or overhead crossbar 14, that force is propagated to absorbers 26 positioned within couplers 20 where the absorbers act as spring-like resilient members. In some embodiments, shock absorbers 26** are formed of ethylene propylene diene monomer (M-class) rubber (i.e., EDPM). In other embodiments, the shock absorbers may be made of high-density polyethylene (HDPE).

Figure 5:
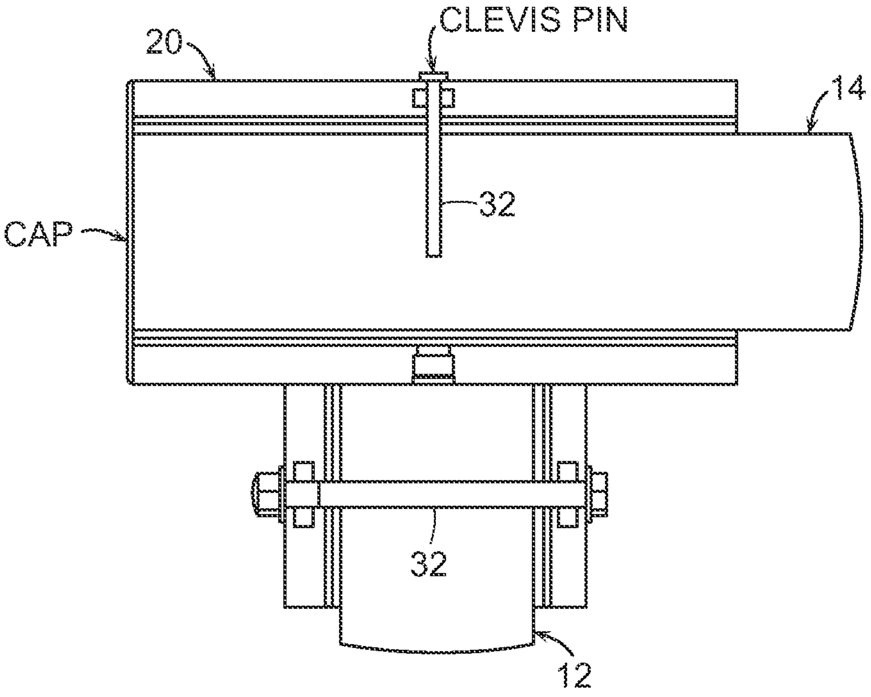
FIG. 5 is cross-sectional side view of a portion of the door frame protection system including the coupler of FIG. 2.

Referring to FIG. 5, and again to FIG. 3, shock absorbers 26 are held within couplers 20 with clevis pins 32, which are positioned within holes 34 of the first and second cylindrical tubes 22, 24 as well as holes 36 of the arcuate protuberances **28*a*, 28*b*, 28*c*, 28*d*. In positioning shock absorbers 26 within the first and second cylindrical tubes 22, 24, holes 34 and holes 36 are first aligned. The size of holes 36 are enlarged, relative to the size of the clevis pins 32, to allow freedom to laterally adjust absorbers 26 with their respective cylindrical tubes. On the other hand, holes 34 are sized more closely to the size of clevis pins 32** so as to have a friction fit and secure the absorbers within the cylindrical tubes.

In the embodiment described above in conjunction with FIGS. 1-5, shock absorbers 26 were positioned within couplers 20. In other embodiments, similar shock absorbers can be positioned within other parts of a door frame protection system (e.g., system 10 as described above).

Referring now to FIG. 6 and FIG. 7, a shock absorber 626 is shown used in conjunction with a lower section **612*b* of a cylindrical upright bar 612 of a door protection system 60. In this embodiment, and as was the case with the door frame protection system shown in FIG. 1, each of the cylindrical upright bars 612 includes an upper section 612*a* positioned within a lower section 612*b* in telescoping fashion to allow for the adjusting of the height of crossbar 614 relative to a mounting base 612*c***.

Shock absorber 626 is also of a similar design as that which is shown in FIG. 4, the only difference being that it is properly sized for use in conjunction with the cylindrical upright bar 612 and may require different hardware for being supported within that assembly.

Referring specifically to FIG. 6, the shock absorber 626 is first positioned within the upper end of lower section 612*b*. A lower end of upper section 612*a* of cylindrical upright bar is then positioned within shock absorber 626, such that the shock absorber is positioned between the outer surface of upper section 612*a* and the inner surface of lower section 612*b*. The shock absorber 626 fits snugly between the two sections utilizing a pin 627. The pin 627 is inserted through a receiving hole 604 in the lower section 612*b* and further through holes (not shown) present in the shock absorber 626 and the upper section 612*a* when they are all sufficiently aligned, thus allowing for a fit as previously described.

In addition, a protective cap 612*d* is positioned around the lower section 612*b* and rests on top of a mounting base 612*c* to which the lower section 612*b* is affixed. During assembly of the door protection system 60, the protective cap 612*d* is slid loosely around the upper section 612*a* before it is inserted into the lower section 612*b*. The upper section 612*a* is then placed within the shock absorber 626 and the lower section 612*b* in the manner previously described. Upon constructing the above-described assembly in the manner set forth above, the protective cap 612*d* can be slid down from its location on the upper section 612*a* to a placement around the lower section 612*b*. When placed around the lower section 612*b* in this manner, the protective cap 612*d* hides the receiving hole 604 from view.

Referring to FIG. 7, mounting base 612*c* is shown in this embodiment, to include five anchoring holes 614—one located in each of its four corners, and one at a center region of the mounting base. Each anchoring hole 614 is configured to receive an anchoring bolt 616, which in turn serves to securely fix the mounting base 612*c* to a secure, flat surface The mounting base 612*c* is further shown to have anchoring bolts 616 present in each of its anchoring holes 614 (anchoring holes 614 not visible from this perspective). Note that in this view, the position of shock absorber 626 is shown as fitting snugly within the lower section 612*b* so as to allow for a fit in the manner described above, utilizing pin 627.

Alternatives

In some examples in the embodiments described above, the cylindrical upright bars 12, 612, cylindrical overhead crossbar 14, and coupler 20 are made from an HDPE material having a high visibility color (e.g. yellow). In some examples, the cylindrical upright bars 12, cylindrical overhead crossbar 14, and coupler 20 are colored with an alternating pattern of black and a high visibility color (e.g., horizontally striped).

In some examples where the upright bars and the overhead crossbar are made of metal (e.g., steel), the upright bars and the overhead crossbar are painted with a high visibility paint color (e.g., yellow). In other examples, the upright bars and the overhead crossbar may be made from an HDPE material having a high visibility color.

In some examples, the bolts used to anchor the upright bars to the ground are secured into the ground using an epoxy resin anchor foundation.

It is to be understood that the foregoing description is intended to illustrate and not to limit the scope of the invention, which is defined by the scope of the appended claims. Other embodiments are within the scope of the following claims.

What is claimed is:

1. A door frame protection system comprising:

a first upright bar including:

a first upper section having a first outer dimension and a first length;

a first lower section configured to receive the first upper section wherein an inner dimension of the first lower section is greater than the first outer dimension of the first upper section;

a first shock absorber configured to be positioned within the first lower section and around the first upper section, the first shock absorber having an outer dimension less than the inner dimension of the first lower section and an inner dimension greater than that of the outer dimension of the first upper section;

a first mounting assembly configured to secure the first lower section to a ground portion;

a second upright bar including:

a second upper section having a second outer dimension and a second length;

a second lower section configured to receive the second upper section wherein an inner dimension of the second lower section is greater than the second outer dimension of the second upper section;

a second shock absorber configured to be positioned within the second lower section and around the second upper section, the second shock absorber having an outer dimension less than the inner dimension of the second lower section and an inner dimension greater than that of the outer dimension of the second upper section;

a second mounting assembly configured to secure the second lower section to a ground portion;

a third bar having a third outer dimension and a third length, wherein the third bar is coupled to the first upright bar and the second upright bar;

a first coupler having an inner dimension that is greater than the first outer dimension of the first upright bar and greater than the third outer dimension of the third bar; and a second coupler having an inner dimension that is greater than the second outer dimension of the second upright bar and greater than the third outer dimension of the third bar;

wherein:

the upper section of the first upright bar includes a first upper section receiving hole;

the first shock absorber includes a first shock absorber receiving hole; and the lower section of the first upright bar includes a first lower section receiving hole; and wherein the door frame protection system further includes a first upright bar pin configured to be inserted through the first upper section receiving hole, the first shock absorber receiving hole, and the first lower section receiving hole when the first upper section receiving hole, first shock absorber receiving hole, and first lower section receiving hole are substantially aligned.

2. The door frame protection system of claim 1 wherein each of the first and second shock absorbers includes a protruded section and a non-protruded section wherein:

the protruded section comprises a protruded inner diameter and a protruded outer diameter;

the protruded section includes a first pair of arcuate protuberances and a second pair of arcuate protuberances wherein: the arcuate protuberances in the first pair are diametrically opposed from each other; and the arcuate protuberances in the second pair are diametrically opposed from each other;

the non-protruded section comprises a non-protruded inner diameter and a non-protruded outer diameter wherein the non-protruded outer diameter is equal to the protruded inner diameter;

the outer dimension of each of the first and second shock absorbers is defined by the protruded outer diameter; and the inner dimension of each of the first and second shock absorbers is defined by the non-protruded inner diameter.

3. The door frame protection system of claim 1 wherein:

the first upright bar is cylindrical;

the second upright bar is cylindrical;

the third bar is cylindrical;

the first shock absorber is cylindrical; and the second shock absorber is cylindrical.

4. The door frame protection system of claim 3 wherein:

the first outer dimension of the first upper section is a first outer diameter of the first upper section;

the first inner dimension of the first lower section is a first inner diameter of the first lower section;

the second outer dimension of the second upper section is a second outer diameter of the second upper section;

the second inner dimension of the second lower section is a second inner diameter of the second lower section;

the third outer dimension of the third bar is a third outer diameter of the third bar;

the outer dimension of the first shock absorber is an outer diameter of the first shock absorber;

the inner dimension of the first shock absorber is an inner diameter of the first shock absorber;

the outer dimension of the second shock absorber is an outer diameter of the second shock absorber;

the inner dimension of the second shock absorber is an inner diameter of the second shock absorber;

the inner dimension of the first coupler is an inner diameter of the first coupler; and the inner dimension of the second coupler is an inner diameter of the first coupler.

5. The door frame protection system of claim 4 including a first pin configured to couple the first upright bar to the first coupler.

6. The door frame protection system of claim 5 including a second pin configured to couple the third bar to the first coupler.

7. The door frame protection system of claim 6 including a third pin configured to couple the second upright bar to the second coupler.

8. The door frame protection system of claim 7 including a fourth pin configured to couple the third bar to the second coupler.

9. The door frame protection system of claim 4 wherein the third bar is coupled between the first coupler and the second coupler.

10. The door frame protection system of claim 1 wherein:

the upper section of the second upright bar includes a second upper section receiving hole;

the second shock absorber includes a second shock absorber receiving hole; and the lower section of the second upright bar includes a second lower section receiving hole; and wherein the door frame protection system further includes a second upright bar pin configured to be inserted through the second upper section receiving hole, the second shock absorber receiving hole, and the second lower section receiving hole when the second upper section receiving hole, second shock absorber receiving hole, and second lower section receiving hole are substantially aligned.

11. The door frame protection system of claim 1, wherein a first protective cap is situated around the first lower section, and a second protective cap is situated around the second lower section.

* * * * *